United States Patent [19]

Droulon

[11] Patent Number: 5,451,096
[45] Date of Patent: Sep. 19, 1995

[54] ARTICULATION FOR MOTOR VEHICLE SEATS

[75] Inventor: Georges Droulon, Flers, France

[73] Assignee: Bertrand Faure Automobile "BFA", Essonne, France

[21] Appl. No.: 238,897

[22] Filed: May 6, 1994

[30] Foreign Application Priority Data

May 7, 1993 [FR] France ................... 93 05501

[51] Int. Cl.⁶ ..................... A47C 15/00; A47C 31/00; B60N 2/02
[52] U.S. Cl. .................................. 297/463.1; 297/362
[58] Field of Search ................... 297/354.12, 362, 366, 297/373, 463, 452.18; 403/282, 274, 279

[56] References Cited

U.S. PATENT DOCUMENTS

| 1,562,419 | 11/1925 | Bowen | 403/282 |
| 4,943,116 | 7/1990 | Ohwada et al. | 297/362 |
| 5,016,940 | 5/1991 | Holloway | 297/354.12 |

FOREIGN PATENT DOCUMENTS

| 0159926 | 10/1985 | European Pat. Off. |
| 0290309 | 11/1988 | European Pat. Off. |
| 0316193 | 5/1989 | European Pat. Off. |
| 0410850 | 1/1991 | European Pat. Off. |
| 3529887 | 3/1987 | Germany |

Primary Examiner—Peter R. Crown
Assistant Examiner—Anthony Barfield
Attorney, Agent, or Firm—Paul & Paul

[57] ABSTRACT

The articulation comprises two flanges enclosing an inner mechanism and a closing lid. A first one of the flanges is elongated to form an elongated flange having a half circumference provided with cut-outs. An other one of the two flanges is circular. The closing lid has a periphery with curved over tabs that fit on the elongated flange. The cut-outs on the half circumference of the elongated flange enable passage of the tabs.

3 Claims, 1 Drawing Sheet

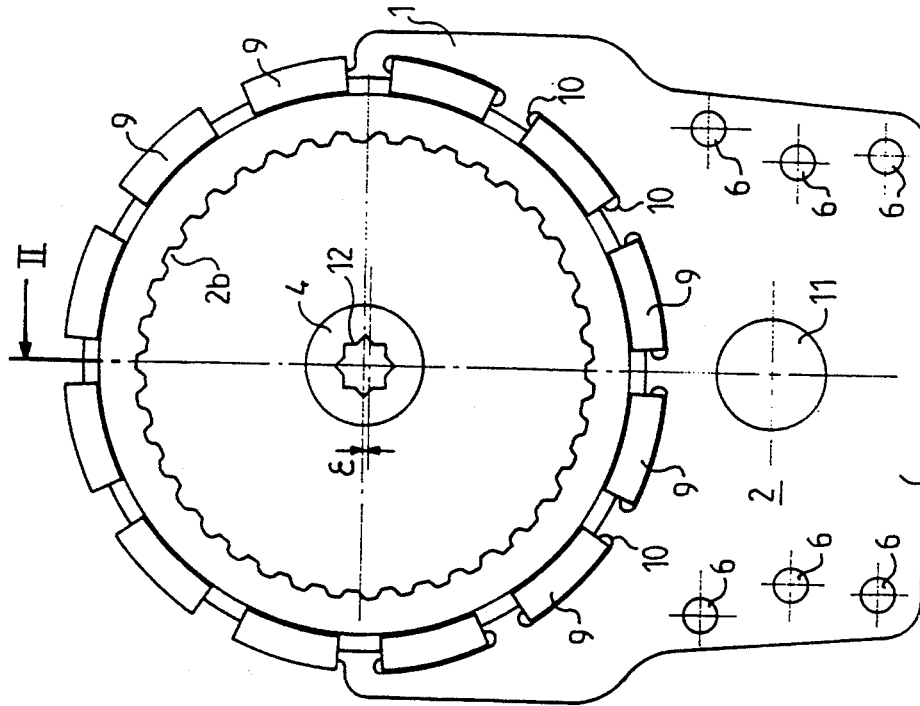
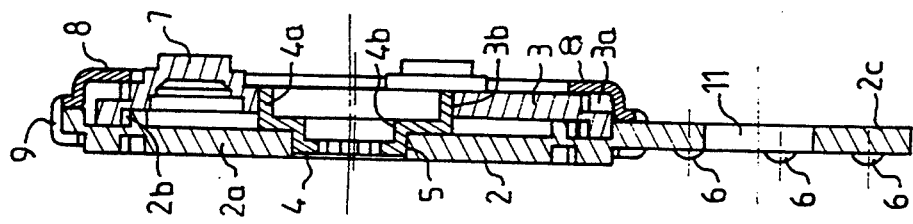
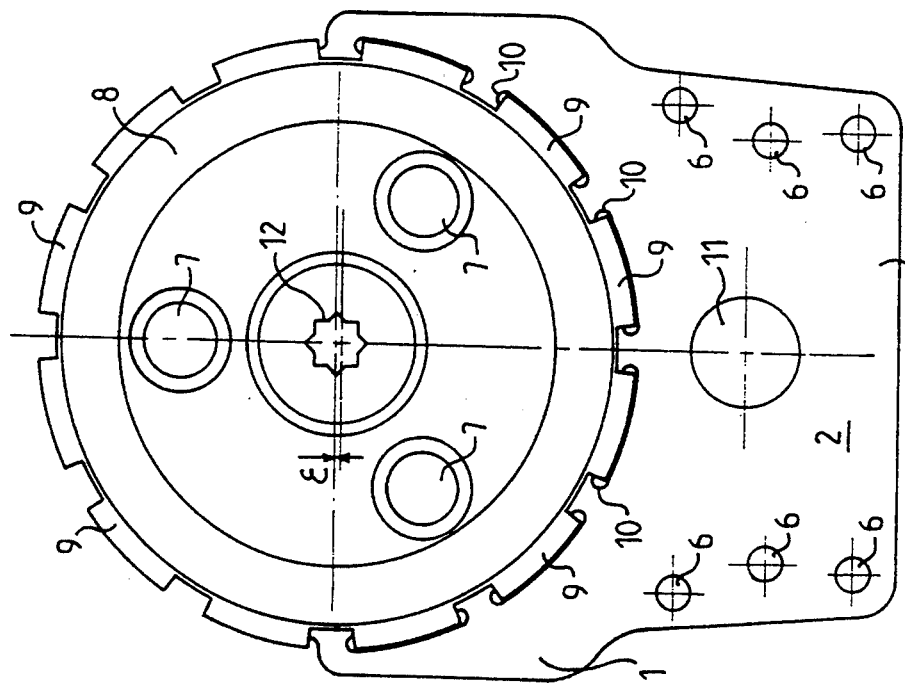

ARTICULATION FOR MOTOR VEHICLE SEATS

FIELD OF THE INVENTION

The invention relates to an articulation for motor vehicle seats

BACKGROUND OF THE INVENTION

Articulations have been known for a long time which are used either to adjust inclination of the backing portion of a vehicle seat, or to adjust height of the sitting portion of this seat.

These articulations are of two kinds, mainly either articulations with two elongated flanges for enabling fixation of the articulation i) on the fixed portion of the seat in consideration and ii) on the mobile portion or, on the contrary, articulations with circular flanges having an outer surface with protrusions enabling fixation of these circular flanges alternately on the fixed portion or on the mobile portion of the seat. The mechanisms used in these articulations are all known and belong either to the "continuous" type articulations with or without a satellite, or to the "discontinuous" type articulations, i.e. with at least one sliding block, and generally three sliding blocks, placed at 120° with respect to one another and cooperating with an inner toothing forming a mobile ring.

The articulations with elongated flanges have a great disadvantage insofar as in certain extreme angular positions of one flange with respect to the other flange, the stability of the two flanges is not ensured.

The articulations with round flanges comprise a closing ring providing for a good stability of the flanges whatever is their angular position. But unfortunately such flanges are difficult to make interdependent in particular with a structure formed of a tube.

OBJECT OF THE INVENTION

The object of the present invention is therefore to provide an articulation of a simple construction which can receive a "continuous" or "discontinuous" mechanism and which can be mounted on various structures of sitting and backing portions, one being made of a metal sheet and the other of a tube, while ensuring a good stability from one flange to the other.

SUMMARY OF THE INVENTION

According to the invention, the articulation provided for motor vehicle seats comprising two flanges enclosing an inner mechanism which can be "continuous" or "discontinuous" and a closing lid, is characterized in that a first one of the flanges is elongated to form an elongated flange having a half circumference provided with cut-outs, an other one of the two flanges being circular, the closing lid having a periphery with curved-over tabs that fit on the elongated flange, the cut-outs on the half circumference of the elongated flange enabling passage of the tabs.

Various other features of the invention will become more apparent from the following detailed description.

BRIEF DESCRIPTION OF THE DRAWINGS

An embodiment of the invention is shown by way of non limiting example in the accompanying drawings, wherein:

FIG. 1 is a front elevation view of the articulation taken on the side of the lid, FIG. 2 is a diametrical cross sectional view taken along line II—II of FIG. 3;

FIG. 3 is a front elevation view taken on the side of the elongated flange.

DISCLOSURE OF PREFERRED EMBODIMENT

Referring now to the drawings, FIG. 1 is a front view, on the side of the lid, of an articulation 1 which, in the present case, comprises an inner mechanism of the "continuous" type with epicycloidal toothings without satellite. This articulation comprises thus an elongated flange 2 having a circular upper portion 2a which is formed with an inner toothing 2b, also circular, adapted for cooperating with the toothing 3a of a circular inner mobile flange 3 resting, via its recessed central portion 3b, on an outer ring 4a of a cup 4 housed, via its hub 4b, within a hole 5 formed in a center of the upper portion 2a of the flange 2.

As it may be seen in FIG. 2, the ring 4a of the cup 4 is off-centered by a value $\epsilon$ with respect to the hub 4b so that the circular inner mobile flange 3 rolls via its toothing 3a on the toothing 2b of the fixed flange 2.

Moreover, the fixed flange 2 is formed with a lower extension 2c that comprises protrusions 6 adapted for an easy fixation of the flange 2 on one of the parts of the seat, while, in a manner also known, the circular flange 3 comprises three bosses 7 placed at 120° with respect to one another and which also enable an easy fixation of the articulation on the other element of the seat.

Finally, there is provided a crown-shaped lid 8 covering the circular flange 3, the periphery of which is formed with regularly spaced apart cut-out tabs 9, which fit into elongated openings 10 formed in the lower portion 2c of the flange 2, and which are then folded over 180° in order to firmly maintain the flange 3 on the flange 2, and this more especially that in the upper portion of the articulation, the tabs 9 of the lid 8 are enclosed over the outer periphery of the fixed flange 2 (see FIG. 2).

There is hereby obtained, in an easy manner, the possibility of maintaining the mobile flange 3 since the mounting of the articulation can be made on an automatic machine positioning the cup 4 into the flange 2, the flange 3 on the ring 4a of the cup 4 to form an assembly and then finally the lid 8, placed concentrically to the hereabove mentioned assembly. Thereafter, the machine provides the clamping the tabs 9.

It should be pointed out that a hole 11, formed in the extension 2c of the fixed flange 2, enables an automatic centering of the articulation on the sitting portion or on the backing portion.

Moreover, the cup 4 comprises a central portion with a fluted channel 12 receiving a shaft, also fluted and driven either manually or with the assistance of a motor.

Of course, devices can be provided in the fixed flange 2 for enabling a correct maintaining of sliding blocks cooperating with the circular toothing 3a of the mobile flange 3 which, in that case, is not out of center so as to form a "discontinuous" inner mechanism, the mounting of the other elements being identical to the previously described mounting.

What I claim is:

1. An articulation for motor vehicle seats comprising an elongated flange and a circular flange enclosing an adjusting mechanism, and further comprising a lid covering said circular flange, said circular flange being moveable in relation to said elongated flange, wherein said elongated flange comprises an elongated portion having a half circumference of cut-outs provided therein, and wherein the periphery of said lid is provided with curved over tabs that fit over the outer periphery of said elongated flange and that fit through the cut-outs.

2. The articulation of claim 1, wherein said elongated portion of said elongated flange comprises a plurality of protrusions facilitating fixation of said elongated flange, and wherein said circular flange comprises a set of bosses placed at approximately 120° with respect to one another.

3. The articulation of claim 1, wherein said elongated portion of said elongated flange is provided having a hole therein for facilitating the positioning of the articulation on a sitting portion or on a backing portion of a seat.

* * * * *